(12) United States Patent
Ramachandra

(10) Patent No.: US 8,729,923 B2
(45) Date of Patent: May 20, 2014

(54) MAJORITY VOTE CIRCUIT

(75) Inventor: Venkatesh Ramachandra, San Jose, CA (US)

(73) Assignee: SanDisk Technologies Inc., Plano, TX (US)

( * ) Notice: Subject to any disclaimer, the term of this patent is extended or adjusted under 35 U.S.C. 154(b) by 0 days.

(21) Appl. No.: 13/598,440

(22) Filed: Aug. 29, 2012

(65) Prior Publication Data

US 2014/0062529 A1    Mar. 6, 2014

(51) Int. Cl.
*H03K 19/003*    (2006.01)
*H03M 7/00*    (2006.01)

(52) U.S. Cl.
USPC ............. 326/11; 326/35; 326/36; 714/760; 714/797

(58) Field of Classification Search
None
See application file for complete search history.

(56) References Cited

U.S. PATENT DOCUMENTS

| | | | |
|---|---|---|---|
| 6,247,160 B1 * | 6/2001 | Davidsson et al. | 714/797 |
| 7,183,795 B2 * | 2/2007 | Ye et al. | 326/36 |
| 7,236,005 B1 * | 6/2007 | Yee et al. | 326/36 |
| 7,394,285 B2 * | 7/2008 | Oh et al. | 326/38 |
| 7,406,608 B2 | 7/2008 | Joshi | |
| 7,466,608 B2 * | 12/2008 | Park | 365/191 |
| 7,471,115 B2 * | 12/2008 | Bernstein et al. | 326/95 |
| 7,506,146 B2 | 3/2009 | Joshi | |
| 7,600,181 B2 * | 10/2009 | Alleyne et al. | 714/811 |
| 7,616,133 B2 | 11/2009 | Hollis | |
| 7,620,883 B1 * | 11/2009 | Carmichael et al. | 714/797 |
| 7,688,102 B2 * | 3/2010 | Bae et al. | 326/11 |
| 7,703,063 B2 * | 4/2010 | Hovis et al. | 716/122 |
| 8,271,912 B2 * | 9/2012 | Ellavsky et al. | 716/101 |
| 8,325,792 B2 * | 12/2012 | Sunaga et al. | 375/233 |
| 8,476,924 B2 * | 7/2013 | Choi et al. | 326/36 |
| 2007/0069589 A1 | 3/2007 | Oh et al. | |
| 2007/0115733 A1 | 5/2007 | Jang et al. | |
| 2009/0241073 A1 * | 9/2009 | Ellavsky et al. | 716/2 |
| 2011/0096825 A1 * | 4/2011 | Hollis | 375/233 |
| 2013/0070835 A1 * | 3/2013 | Sindalovsky et al. | 375/238 |

OTHER PUBLICATIONS

Notification of Transmittal of the International Search Report and the Written Opinion of the International Searching Authority, or the Declaration for International Appl. No. PCT/US2013/054195 mailed Dec. 20, 2013, 9 pages.

* cited by examiner

*Primary Examiner* — Alexander H Taningco
*Assistant Examiner* — Nelson Correa
(74) *Attorney, Agent, or Firm* — Davis Wright Tremaine LLP

(57) ABSTRACT

Data words from a parallel communication channel are interleaved to two majority vote blocks that operate out of phase, using a divided clock signal that has half the clock frequency of the clock signal associated with the parallel communication channel. As one majority vote block evaluates a data word and outputs a result, the other majority vote block is in pre-charge mode awaiting the next data for evaluation.

20 Claims, 7 Drawing Sheets

MAJORITY VOTE CIRCUIT

BACKGROUND

This application relates to majority vote circuits, and to their use in various applications including bus inversion circuits.

Majority vote circuits are common circuits that have many applications. A majority vote circuit receives multiple bits and determines whether there are more logic "0" bits, or more logic "1" bits. Such bits are generally received through conductive lines that may have a higher voltage, or lower voltage, designating "0" or "1". Assignment of a logic state to a voltage is arbitrary (i.e. high voltage could correspond to "0" and low voltage to "1" or vice versa). A majority vote circuit gives an output that reflects whether the majority of inputs are high or low. Typically, there is an even number of inputs so that there can be an equal number of bits in each logic state and this case may be provided for by having a tie-breaker of some sort so that the output in this case is predetermined as either a "0" or a "1."

FIG. 1 shows a simple illustration of a prior art majority vote circuit. Multiple individual conductors (n conductors in this example) form a parallel communication channel that provides an input to the majority vote circuit. For example, 8 conductors may provide an 8-bit (one byte) input. Such a parallel input provides one byte at a time as a data word. Typically, one data word is provided at each clock cycle, though higher data rates are possible. The majority vote circuit generates an output (O/P) that indicates the majority logic state for a particular data word.

FIG. 2 shows an example of a prior art digital majority vote circuit that uses full adders to add together nine inputs and provide an output that is high if five or more of the nine inputs are high. However, such digital circuits are generally slow and cannot generate the output in a single clock cycle. Thus, such digital circuits may be unsuitable for high-speed applications.

FIG. 3 shows an example of an analog majority vote circuit where individual inputs are combined at a common node which is pulled to a high or low voltage according to the majority of inputs provided. This node is compared with a threshold voltage by a comparator. The value of the threshold voltage may be selected so that an output remains low when the number of high inputs is four or fewer. When five or more inputs are high, the common node reaches a voltage that exceeds the threshold voltage and the comparator output changes. However, while such analog majority vote circuits may be relatively fast, they are not accurate or reliable especially for a large numbers of inputs. Analog majority vote circuits may also consume significant power.

Conventional majority vote circuits suffer from several drawbacks including speed, reliability, and size. Therefore, there is a need for fast, reliable, small majority vote circuits.

SUMMARY

According to a general aspect, data words from a parallel communication channel are interleaved to two majority vote blocks that operate out of phase, using a divided clock signal that has half the clock frequency of the clock signal associated with the parallel communication channel. As one majority vote block is evaluating a data word and outputting a result, the other majority vote block is latching a subsequent data word and precharging. The relatively long times provided for precharging and evaluation allow more accurate determinations. And divided clock signals are independent of effects of duty cycle variation in the clock signal associated with the parallel communication channel. Duty cycle is a major concern when dealing with clock signals transmitted between two chips like in the case of a source synchronous interface.

An example of a majority voting circuit includes: a parallel data input that provides a sequence of data words; a clock input having a specified clock cycle; a first comparator that obtains a majority vote from even data words of the parallel data input during a first phase; and a second comparator that obtains a majority vote from odd data words of the parallel data input during a second phase.

A majority voting circuit may include a clock frequency divider that provides a divided clock signal that has a frequency that is a fraction of the frequency of the clock input. The first phase may be a first phase of the divided clock signal and the second phase may be a second phase of the divided clock signal. The duration of the first phase of the divided clock signal and the duration of the second phase of the divided clock signal may be controlled by the frequency of the specified clock signal and may be unaffected by the duty cycle of the specified clock signal. An output circuit may alternately provide an output from the first comparator and the second comparator.

An example of an interleaving majority voting circuit includes: a first comparator that compares a first plurality of bits of a parallel signal with an inverse of the first plurality of bits in a first comparator evaluation phase; a second comparator that compares a second plurality of bits of a parallel signal with an inverse of the second plurality of bits in a second comparator evaluation phase; a clock signal provided to the first comparator and the second comparator to alternate the first comparator evaluation phase and the second comparator evaluation phase; and an output circuit that interleaves a first output signal from the first comparator and a second output signal from the second comparator to provide a time-interleaved output.

A majority voting circuit may also include: a first comparator precharge circuit that precharges the first comparator in a first comparator precharge phase; and a second comparator precharge circuit that precharges the second comparator in a second comparator precharge phase that alternates with the first comparator precharge phase. It may also include: a first edge detector that analyzes discharge of the first comparator during the first comparator evaluation phase and generates the first output signal: and a second edge detector that analyzes discharge of the second comparator during the second comparator evaluation phase and generates the second output signal. The first edge detector may comprise a first amplifier and a second amplifier connected to the first comparator to amplify falling edges produced by discharge of the first comparator. The first edge detector may further comprise a latch connected to the first and second amplifiers to latch an output initiated by a falling edge produced by discharge of the first comparator. A clock frequency divider may receive a specified clock signal associated with the parallel signal and divide the specified clock signal to generate the clock signal provided to the first comparator and the second comparator. The clock frequency divider may divide the specified clock signal by two. The clock signal provided to the first comparator and the second comparator has a cycle time and a duty cycle that are independent of the duty cycle of the specified clock signal. The output circuit may be a simple NAND gate whose inputs are the interleaving outputs of the 2 comparators. At a given time 1 input of the NAND gate is always high due to precharge phase of one of the comparators and the other input is the output of the evaluating phase of the other comparator. At least one XOR gate may be provided for inverting the data based on the NAND gate output.

An example of a method of obtaining majority voting determinations for a stream of data words from a parallel communication channel includes: operating a first comparator to obtain majority voting determinations for odd data words; operating a second comparator, out of phase with the first comparator, to obtain majority voting determinations for even data words; and multiplexing the majority voting determinations for the odd data words and the even data words.

The method may also include dividing a clock signal associated with the parallel communication channel to obtain a divided clock signal used in the first comparator and the second comparator. The first comparator may be precharged while obtaining a majority voting determination in the second comparator, and the second comparator may be precharged while obtaining a majority voting determination in the first comparator. Majority voting determination may be performed by detecting falling edges as a previously precharged comparator discharges. Majority voting determination may be used to determine whether to invert a data word.

Various aspects, advantages, features and embodiments of the present invention are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

DETAILED DESCRIPTION

Figure 1:
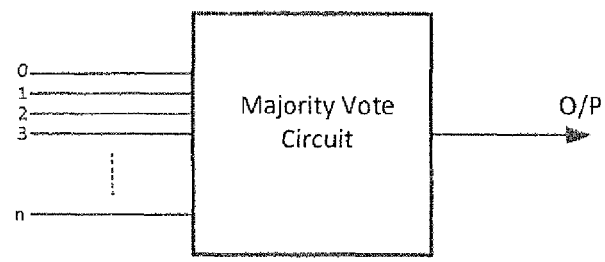
FIG. 1 illustrates a prior art majority vote circuit.
Figure 2:
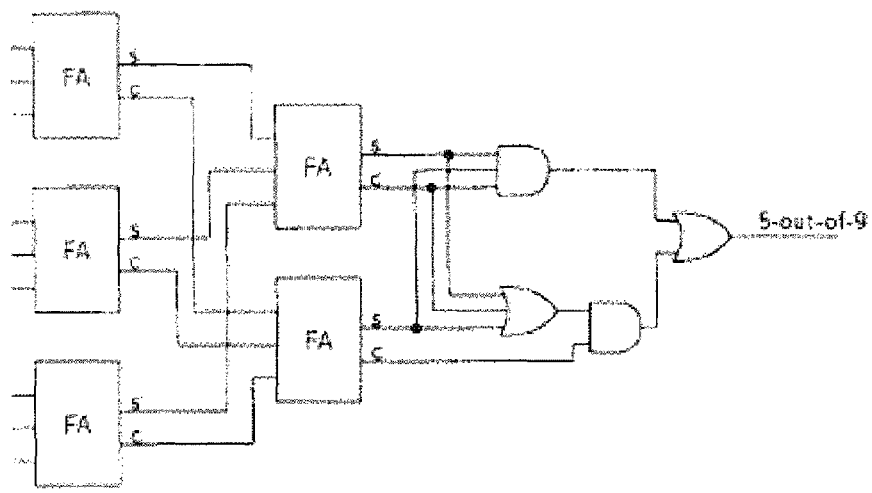
FIG. 2 illustrates an example of a prior art digital majority vote circuit.
Figure 3:
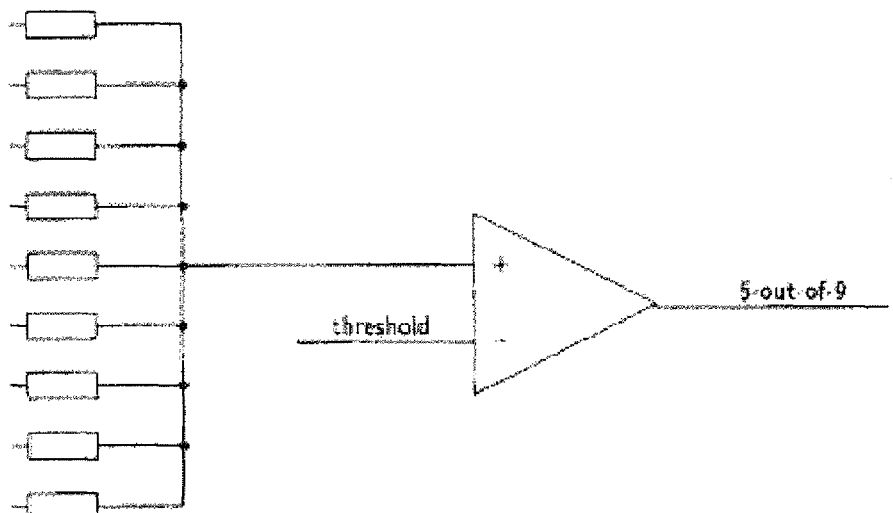
FIG. 3 illustrates an example of a prior art analog majority vote circuit.
Figure 4:
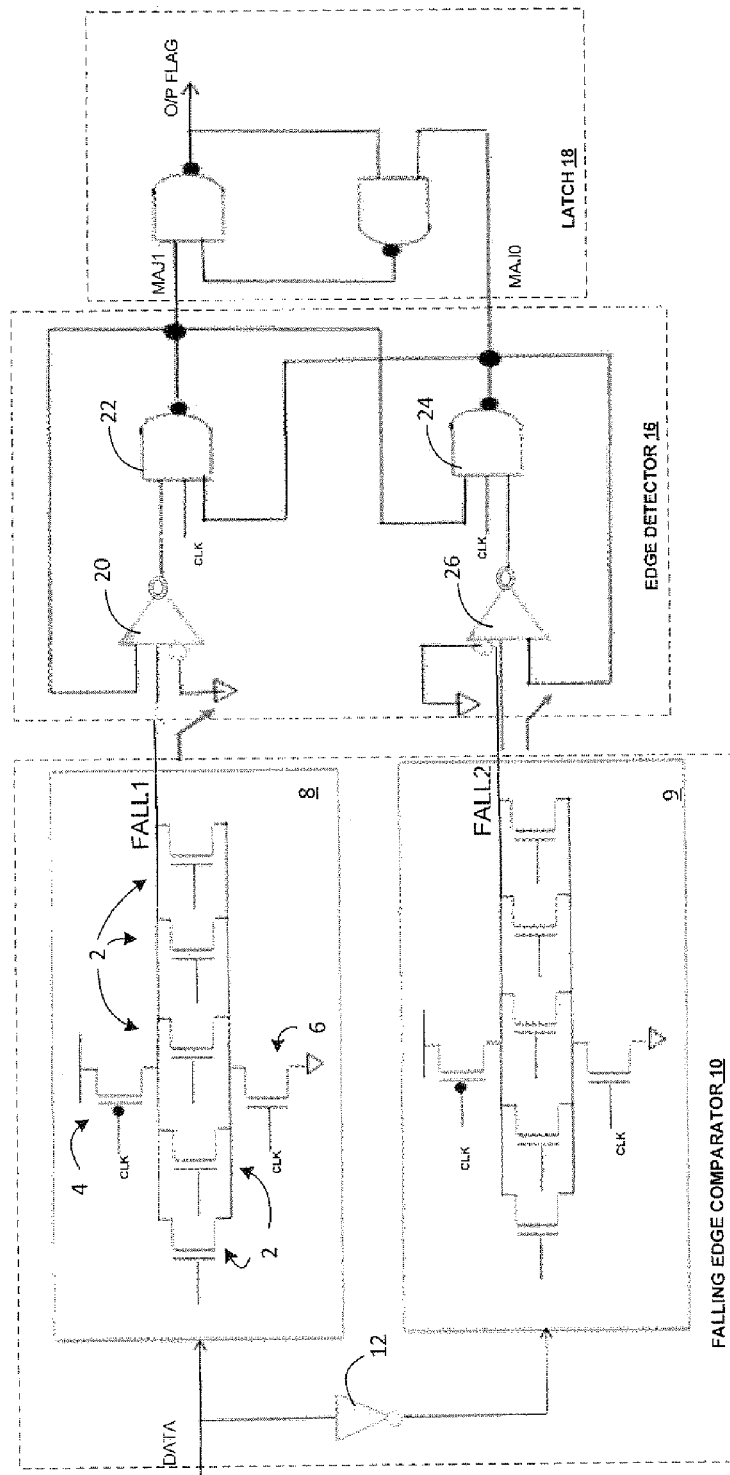
FIG. 4 illustrates a majority vote circuit using an edge detector.

FIG. 4 illustrates a majority vote circuit that includes a falling edge comparator 10 that has a precharge phase and an evaluation phase. The comparator 10 includes an upper block 8 formed by transistors 2 that are connected in parallel between a supply voltage (e.g. Vcc) and a common voltage (e.g. ground) with control transistors connected to alternately connect the transistors to the supply voltage and to the common voltage. In the example shown, the control transistors are a PMOS transistor 4 and an NMOS transistor 6, that are both controlled by the same clock signal (CLK) so that one is on while the other is off. When the clock signal is low, the PMOS transistor is turned on, and the supply voltage is connected to the upper terminal of the transistors thus precharging the line connecting the upper terminals of transistors 2 to the supply voltage (the NMOS transistor 6 is "off" during this time). This period, the low phase of the clock cycle, may be considered a precharge phase. Data may be loaded into latches connected to the gates of the transistors during this phase.

When the clock signal (CLK) goes high, the PMOS transistor 4 turns off and the NMOS transistor 6 turns on, thus allowing current to flow through the transistors 2. Data latches containing the data to be analyzed are connected to the gates of the transistors 2 so that each data bit controls a transistor (e.g. turning transistor on or off depending on logic state). Current flow through transistors 2 is proportional to the number of transistors that are turned on. Thus, discharge time is inversely proportional to the number of transistors that are turned on. This period, the high phase of the clock cycle, may be considered an evaluation phase during which the current flow, or discharge time, allows evaluation of the data.

Falling edge comparator 10 also includes a second block 9 that is identical to the first block 8. The second block receives the inverse of the data to be analyzed (i.e. each bit is inverted) from an inverter 12 (which may be considered part of the second block, or as a separate component). The inverted data is loaded in block 9 during the precharge cycle so that both data in block 8 and inverted data in block 9 are loaded during pre-charge. Then, during the evaluation phase, this data is applied to gates of the transistors of block 9 where it allows discharge at a rate that is proportional to the number of transistors that are turned on by the inverted data.

It can be seen that during the evaluation phase, one block of transistors will tend to discharge more quickly than the other block depending on how many data bits correspond to a particular logic state. Taking a simple example of four bits, where a logic state "1" in a data latch causes the corresponding transistor to turn on, it can be seen that data word 1000 would turn on one of four transistors, while its inverse 0111 would turn on three of four transistors. Thus, the inverted data would provide a more rapid discharge. By comparing discharge times, the majority logic state may be determined. The two blocks may be thought of as being in a race to discharge with the winner indicating the majority logic state. In some cases, an extra transistor may be added to one of the blocks to act as a tie-breaker so that if the data is split evenly, that block wins, thus avoiding a random result if both blocks discharged at the same rate.

In addition to the falling edge comparator 10, an edge detector 16 is provided to determine which block is first to discharge and an output latch 18 is provided to latch the result. The edge detector 16 receives an input from each of the precharged lines connecting the upper terminals of the transistors. These inputs are used to detect falling edges and the inputs are labeled as FALL0 and FALL1. These two falling edge inputs are used to determine the output of the output latch 18 as illustrated by the timing diagram of FIG. 5. In particular, when a first falling edge enters one of the inverting amplifiers of edge detector 16, it causes the output of that amplifier to go from low to high. This output is provided to a corresponding NAND gate which then goes from high to low.

Figure 5:
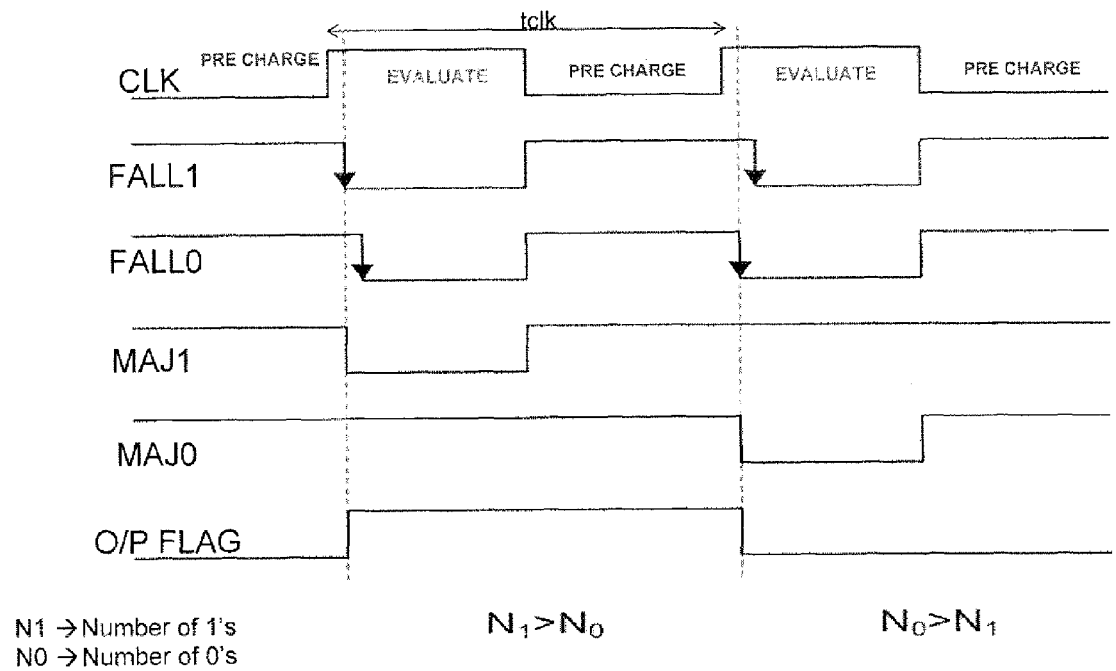
FIG. 5 is a timing diagram showing the operation of the majority vote circuit of FIG. 4.

FIG. 5 shows that during the low (precharge) phase of the clock cycle the falling edge outputs FALL0 and FALL1 are high because PMOS transistors are turned on, thereby connecting these lines to the supply voltage. The outputs MAJ0 and MAJ1 are both high in this phase because the clock is low which keeps NAND gate outputs high. The LATCH 18 holds the previous flag output during this pre-charge phase. Then, when the clock becomes high and the evaluation phase begins, the PMOS transistors turn off, the NMOS transistors turn on, and the lines start to discharge through transistors in blocks 8 and 9.

In the case where $N_1 > N_0$ (more "1"s than "0"s) shown on the left, signal FALL1 falls first because discharge is faster in the upper block 8. The drop in FALL1 causes an output of connected amplifier 20 to go from low to high, which toggles the output of NAND gate 22, MAJ1, from high to low (all NAND inputs are high). Output MAJ1 is provided as an input to the other NAND gate 24 to prevent toggling of its output, MAJ0, when FALL0 later drops. The output MAJ1 toggles the output latch 18 to a high output signifying a majority of "1"s in the data. This output is maintained as a flag (O/P flag) by the latch through the subsequent precharge phase.

In the case where N0>N1 (more "0"s than "1"s) shown on the right, signal FALL0 falls first because discharge is faster in the lower block 9. The drop in FALL0 causes the output of connected amplifier 26 to go from low to high, which toggles the output of NAND gate 24, MAJ0, from high to low (all NAND inputs are high). Output MAJ0 is provided as an input to the other NAND gate 22 to prevent toggling of its output MAP when FALL1 later drops. The output MAJ0 toggles the output latch 18 to a low output signifying a majority of "0"s in the data. This output is maintained by latch 18 as a flag (O/P flag) through the subsequent precharge phase.

While the circuit of FIG. 4 provides an accurate majority vote it may not be suitable for all applications. In particular, where a parallel communication channel has a relatively high clock frequency there is little time to perform precharge and evaluation. FIG. 5 shows a clock cycle of tclk with just tclk/2 for evaluation and tclk/2 for precharge. In high-frequency interfaces, the period, tclk, may be very short so that tclk/2 is insufficient to ensure complete precharging and/or reliable evaluation.

In addition to the difficulty of performing these operations in such short time is the added problem of variability in some clock signals. While a clock frequency is generally specified with precision, the duty cycle of a clock signal may vary widely. For example, a memory interface standard may specify a 5 ns cycle time but allows a duty cycle of 40% (nominal duty cycle 50%). This means that there may be only 2 ns for a given operation instead of the nominal time of 2.5 ns. The time available may vary as the duty cycle varies within the specified limits. This means that such a circuit may be designed for a worst-case scenario (e.g. 2 ns) making it even more difficult than the nominal value would indicate. Thus, operating a majority vote circuit in a manner that depends on the duty cycle is problematic where the duty cycle is not reliable.

Figure 6:
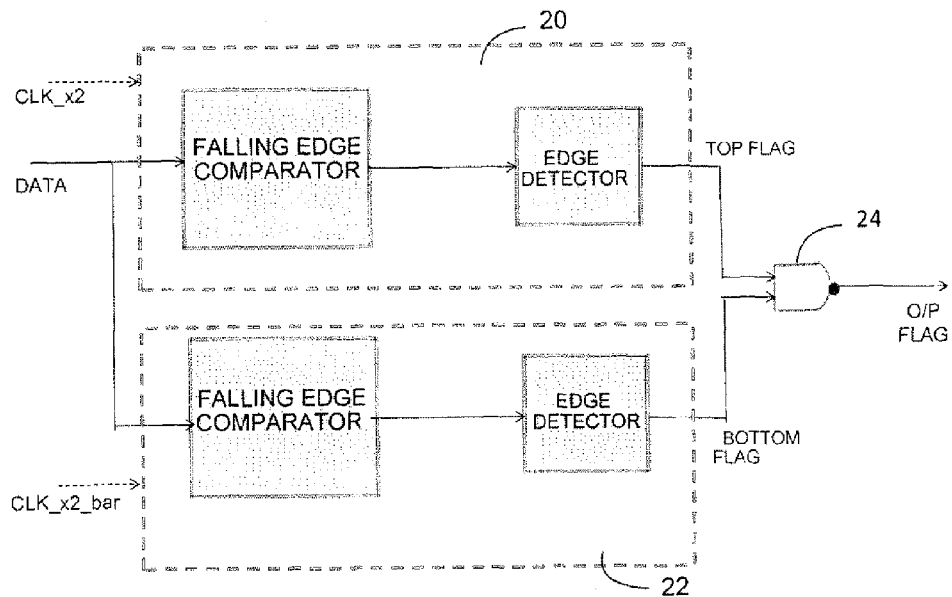
FIG. 6 illustrates an interleaved majority vote circuit.

FIG. 6 shows a block diagram for a majority vote circuit that uses interleaving to allow more time for a given precharge or evaluation operation, and makes the time for such operations independent of the duty cycle of the clock signal used. FIG. 6 shows two majority vote blocks 20, 22 each including a falling edge comparator and an edge detector. The comparator and edge detector may be as shown in FIG. 4, or may use some other design. Data from a parallel communication channel is provided to both majority vote blocks 20, 22.

Each majority vote block uses a different clock signal. The clock signals are derived from a received clock signal (e.g. a clock signal provided as part of the parallel communication channel). A clock signal divider circuit (not shown in FIG. 6) provides a divided output that has half the frequency (double the cycle time) of the received clock signal. One significant result of such division of the clock signal is that the divided clock signal is independent of the duty cycle of the original signal. The divided clock signal (CLK_x2) is provided to majority vote block 20 and its inverse (CLK_x2_bar) is provided to majority vote block 22. This allows the two majority vote blocks to operate out of phase with each other so that while a comparator in one majority vote block is precharging, the comparator in the other majority vote block is evaluating and vice versa. Because of this interleaved operation the outputs from the two majority vote blocks can be combined by a simple NAND gate 24 instead of a LATCH block like latch 18.

Figure 7:
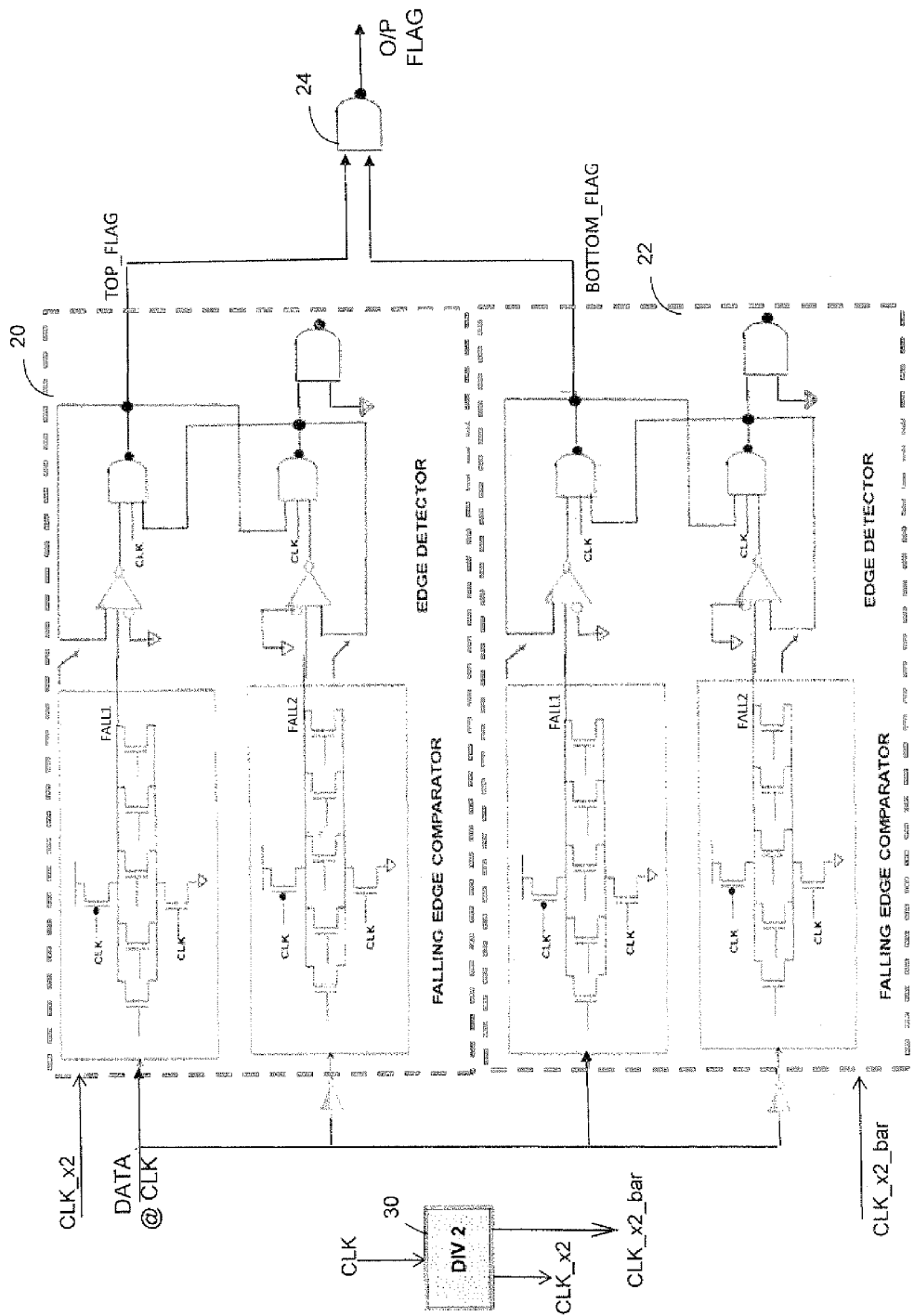
FIG. 7 illustrates an implementation of an interleaved majority vote circuit.

FIG. 7 shows a more detailed view of an example of how the circuit of FIG. 6 may be implemented. The comparators and edge detectors forming the majority vote blocks 20, 22 of FIG. 7 are the same as those previously described with respect to FIG. 4 and their individual operation is the same as previously described. However, the majority vote blocks 20, 22 are operated out of phase with each other so that while one comparator is loading data and performing a precharge operation, the other majority vote block is performing an evaluation operation. Data from a parallel interface may be analyzed in an interleaved manner by the two majority vote blocks. For example, data words provided by a parallel interface may be sequentially ordered 0, 1, 2, 3, 4, 5 . . . etc. Even data words 0, 2, 4 . . . etc. may be analyzed by one majority vote block and odd data words 1, 3, 5 . . . etc. may be analyzed by the other data block.

FIG. 7 shows a clock frequency divider 30 that receives an input clock signal. (CLK) which is synchronized with the data to be analyzed by the majority vote circuit. The clock frequency divider has two outputs that both have the same cycle time but are out of phase. One output clock signal is simply the input clock signal divided by two (CLK_x2), and the other output clock signal is its inverse (CLK_x2_bar). In the example shown, the divided clock signal CLK_x2 is supplied to the upper majority vote block and its inverse, CLK_x2_bar, is supplied to the lower majority vote block.

Figure 8:
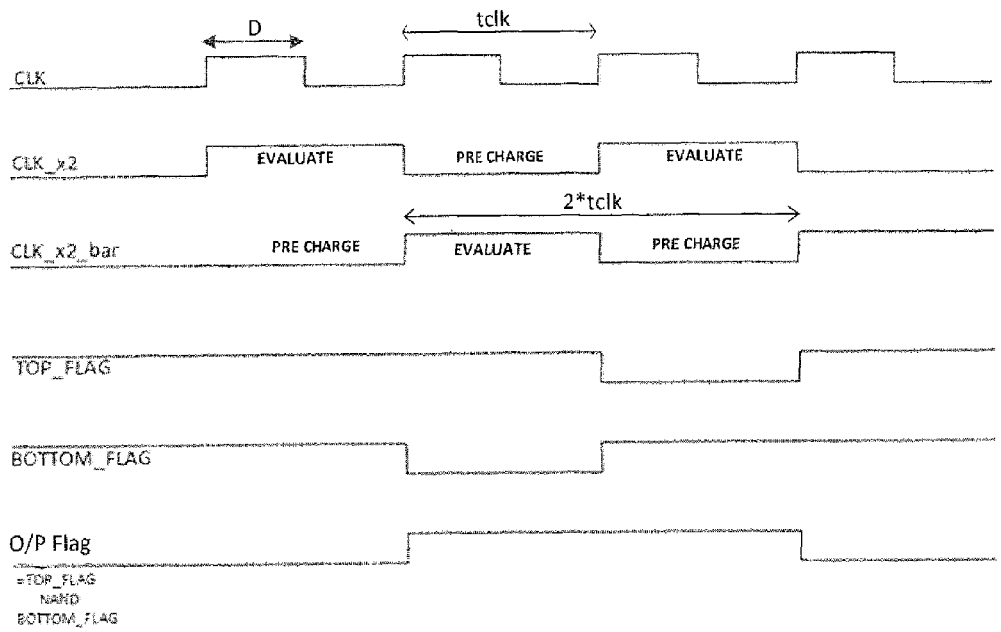
FIG. 8 is a timing diagram illustrating the operation of the interleaved majority vote circuit of FIG. 7.

FIG. 8 is a timing diagram that illustrates the operation of the circuit of FIG. 7 and shows the two divided clock signals, CLK_x2 and its inverse CLK_x2_bar, that are generated from the received clock signal CLK. It can be seen that while CLK has a tclk cycle time, divided clock signals CLK_x2 and CLK_x2_bar have cycle times of 2*tclk. It can also be seen that the divided clock signals depend only on the cycle time of CLK and not on the duty cycle. For example, CLK is shown having a duty cycle D, which is approximately 50%. It can be seen that even if D was reduced to 40% this would not affect the divided clock signals CLK_x2 and CLK_x2_bar, which both have cycle times and duty cycles that depend only on the cycle time of the received clock signal (i.e. rising edge to rising edge of received clock signal). It can be seen that while one divided clock signal is high it places the corresponding majority vote circuit in an evaluation phase in which a comparison is performed. At the same time, the other divided clock signal is low, placing the corresponding majority vote circuit in a precharge phase in which data is latched and a comparator is precharged.

The relatively long times available for precharge and evaluation can generally provide a more accurate result. Precharging is always completed (i.e. the precharged line reaches the supply voltage instead) where a shorter time might terminate precharging before it is complete. And the longer evaluation time allows the use of slower discharge times which amplifies the time difference between falling edges. The evaluation time used in each majority vote block 20, 22, is the period of the clock signal used (CLK_x2, or CLK_x2_bar). This is approximately tclk as shown in FIG. 8, whereas in the example of FIG. 5, the evaluation time was tclk/2.

The outputs of the two majority vote blocks, TOP_FLAG and BOTTOM_FLAG, are obtained from the evaluation operation as before and are recombined by NAND gate 24. Whichever majority vote block is in precharge phase generates a high signal so that the output of NAND gate 24 is always the inverse of the majority vote circuit that is currently in evaluation phase. For example, in FIG. 8 it can be seen that when CLK_x2 is low and the top majority vote block is in precharge phase, TOP_FLAG is high, so that the output of the NAND is the inverse of BOTTOM_FLAG. With BOTTOM_FLAG low, O/P FLAG is high. No other latch is needed because the output of each majority vote block is latched in its edge detector during the evaluation phase.

While the above examples are directed to memory systems that include two majority vote blocks in parallel, other examples may use more than two majority vote blocks. For example, four, eight, or more majority vote blocks could be used in parallel to perform majority vote analysis for high speed parallel communication channels.

Figure 9:
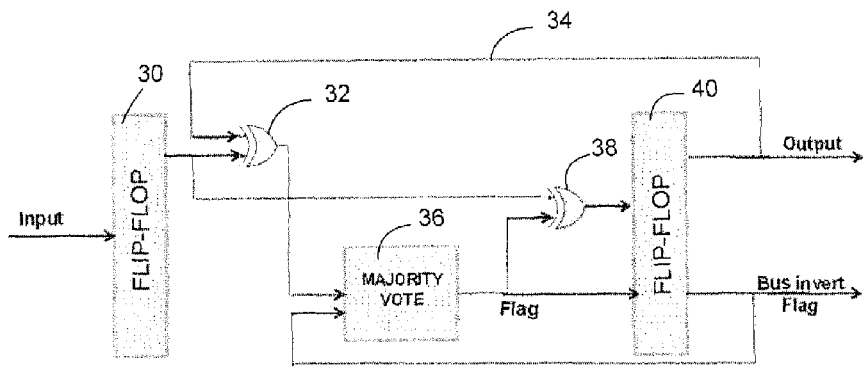
FIG. 9 illustrates an AC bus inversion circuit using a majority vote circuit.

FIG. 9 shows one application for a majority vote circuit such as described above in an AC Bit Inversion (BI) circuit. The aim of AC BI is to reduce the number of transitions (i.e. "1" to "0" or "0" to "1") from one data word to the next by inverting data when inversion would provide a smaller number of transitions. This reduces Simultaneous Switching Noise (SSN) by limiting the number of transitions in same direction to N/2 for an N-bit data that is a 50% max reduction of SSN. In addition AC BI also helps reduce AC switching power as total transitions are also reduced to N/2. In particular, FIG. 9 shows an input, which may be a series of data words provided by a parallel communication channel, is initially latched in a flip-flop 30, then supplied to an XOR gate 32 where a data word is XORed with a previous data word provided by a feedback line 34 from a data output. Thus, the output of XOR gate 32 is a data word in which a "1" indicates a transition. If the number of "1"s is more than half the data word (e.g. more than four "1"s in a byte) then inversion would be beneficial. In order to determine the number of "1"s, a majority vote circuit is provided that counts the "1"s in the output from the XOR, accounts for any transition in the bus inversion flag itself, and provides an output flag indicating whether inversion is beneficial. The inversion flag is generated and is supplied to another XOR gate 38 where, if the flag is high, it causes the data word to be inverted (if the flag is low, data passes through). The data is latched in an output flip-flop 40 along with the bus invert flag and provided as an output of the circuit.

Figure 10A:
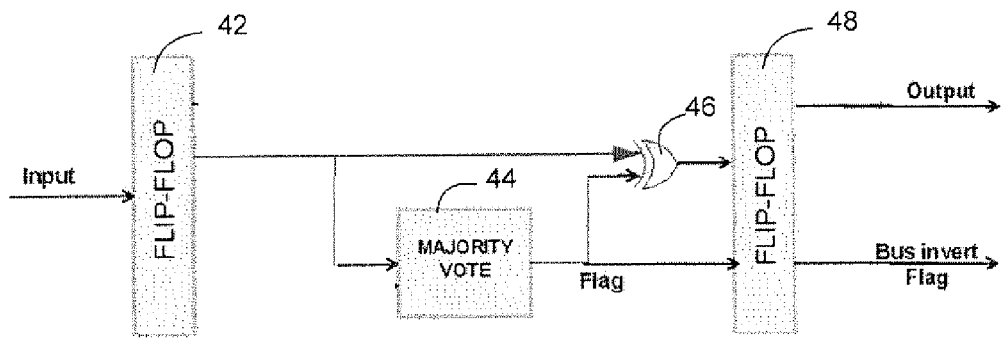
FIG. 10A illustrates a DC bus inversion circuit using a majority vote circuit.

FIG. 10A shows another application for a majority vote circuit such as described above. In this case the majority vote circuit is used in a DC bus inversion circuit. DC BI also helps reduce SSN as the number of transitions in same direction can be restricted to N/2 which is a 50% max SSN reduction. DC BI is useful in cases where DC current is concern. If a "0" consumes DC current then DC BI may be employed to limit the number of "0"s. In FIG. 10A incoming data is latched in a data input flip-flop 42, then the majority vote circuit 44 determines whether there are more "0"s than "1"s. If there are more "0"s then an output flag goes high and causes an XOR gate 46 to invert the data (if the output flag is low, then the data passes through). The data is then latched in a data output flip-flop 48.

Figure 10B:
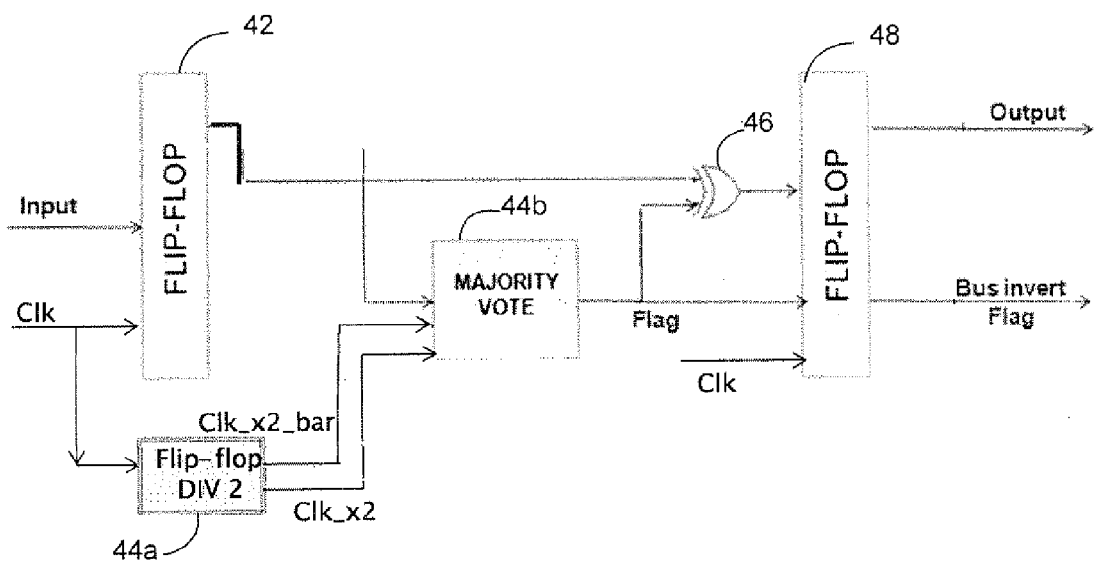
FIG. 10B illustrates the DC bus inversion circuit of FIG. 10A including a clock frequency divider.

FIG. 10B shows a more detailed view of the DC BI circuit of FIG. 10A with the majority vote circuit 44 of FIG. 10A shown as two parts, a clock frequency divider 44a and the remainder of the majority vote circuit, 44b (which includes comparators, edge detectors, and a latch, for example, as previously shown in FIG. 7). Clock frequency divider 44a is a flip-flop circuit which has some inherent delay. However, as shown in FIG. 10B, clock frequency divider 44a operates in parallel with input data flip-flop 42 which has a similar inherent delay. Thus, the delay in the divided clock signals Clk_x2 and Clk_x2_bar does not result in synchronization problems. The delay in the divided clock signals tends to synchronize the divided clock signals with the data being analyzed because the data is similarly subject to a delay by a flip-flop.

Figure 11:
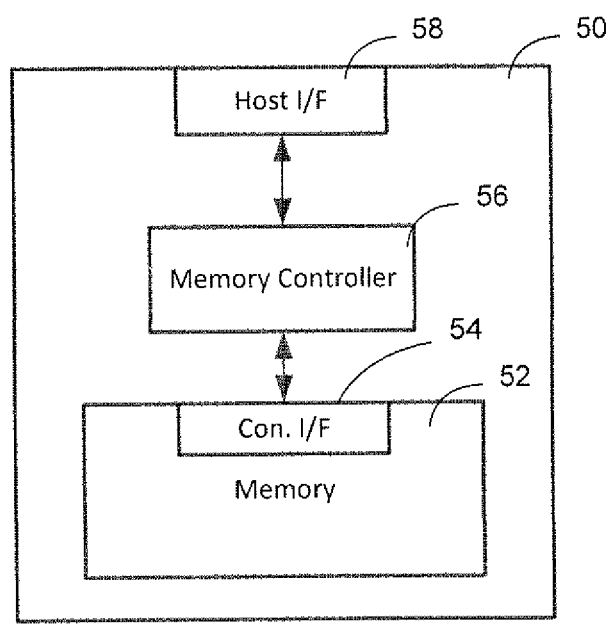
FIG. 11 shows a flash memory system using a majority vote circuit for bit inversion.

FIG. 11 shows a typical nonvolatile memory system 50 such as a memory card, USB thumb drive, Solid State Drive, or other memory system. A memory 52, which may include one or more memory chips, such as NAND flash memory chips, has a controller interface 54 for communication with a memory controller 56. AC or DC bus inversion may be performed in the controller interface 54 to reduce SSN or power consumption. Alternatively, bus inversion may be performed in the memory controller 56, or in the host interface 58. In some cases, more than one bus inversion operation may be performed in such a nonvolatile memory system.

Conclusion

The foregoing detailed description has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

It is claimed:

1. A majority voting circuit comprising: a parallel data input that provides a sequence of data words; a clock input having a specified clock cycle; a first comparator that obtains a majority vote from even data words of the parallel data input during a first phase of the clock input; and a second comparator that obtains a majority vote from odd data words of the parallel data input during a second phase of the clock input.

2. The majority voting circuit of claim 1 further comprising a clock frequency divider that provides a divided clock signal that has a frequency that is a fraction of the frequency of the clock input.

3. The majority voting circuit of claim 2 wherein the first phase is a first phase of the divided clock signal and the second phase is a second phase of the divided clock signal.

4. The majority voting circuit of claim 3 wherein the duration of the first phase of the divided clock signal and the duration of the second phase of the divided clock signal are controlled by the frequency of the specified clock signal and are unaffected by the duty cycle of the specified clock signal.

5. The majority voting circuit of claim 1 further comprising an output circuit that alternately provides an output from the first comparator and the second comparator.

6. An interleaving majority voting circuit comprising:
a first comparator that compares a first plurality of bits of a parallel signal with an inverse of the first plurality of bits in a first comparator evaluation phase;
a second comparator that compares a second plurality of bits of a parallel signal with an inverse of the second plurality of bits in a second comparator evaluation phase;

a clock signal provided to the first comparator and the second comparator to alternate the first comparator evaluation phase and the second comparator evaluation phase; and an output circuit that interleaves a first output signal from the first comparator and a second output signal from the second comparator to provide a time-interleaved output.

7. The interleaving majority voting circuit of claim 6 further comprising:

a first comparator precharge circuit that precharges the first comparator in a first comparator precharge phase; and a second comparator precharge circuit that precharges the second comparator in a second comparator precharge phase that alternates with the first comparator precharge phase.

8. The interleaving majority voting circuit of claim 7 further comprising:

a first edge detector that analyzes discharge of the first comparator during the first comparator evaluation phase and generates the first output signal: and a second edge detector that analyzes discharge of the second comparator during the second comparator evaluation phase and generates the second output signal.

9. The interleaving majority voting circuit of claim 8 wherein the first edge detector comprises a first amplifier and a second amplifier connected to the first comparator to amplify falling edges produced by discharge of the first comparator.

10. The interleaving majority voting circuit of claim 9 wherein the first edge detector further comprises a latch connected to the first and second amplifiers to latch an output initiated by a falling edge produced by discharge of the first comparator.

11. The interleaving majority voting circuit of claim 6 further comprising a clock frequency divider that receives a specified clock signal associated with the parallel signal and divides the specified clock signal to generate the clock signal provided to the first comparator and the second comparator.

12. The interleaving majority voting circuit of claim 11 wherein the clock frequency divider divides the specified clock signal by two to generate the clock signal provided to the first comparator and the second comparator.

13. The interleaving majority voting circuit of claim 12 wherein the clock signal provided to the first comparator and the second comparator has a cycle time and a duty cycle that are independent of the duty cycle of the specified clock signal.

14. The interleaving majority voting circuit of claim 6 wherein the output circuit is a NAND gate.

15. The interleaving majority voting circuit of claim 6 further comprising at least one XOR gate provided for bus inversion.

16. A method of obtaining majority voting determinations for a stream of data words alternating odd and even data words from a parallel communication channel comprising: operating a first comparator to obtain majority voting determinations for odd data words; operating a second comparator, out of phase with the first comparator, to obtain majority voting determinations for even data words; and multiplexing the majority voting determinations for the odd data words and the even data words.

17. The method of claim 16 further comprising dividing a clock signal associated with the parallel communication channel to obtain a divided clock signal used in the first comparator and the second comparator.

18. The method of claim 16 further comprising precharging the first comparator while obtaining a majority voting determination in the second comparator, and precharging the second comparator while obtaining a majority voting determination in the first comparator.

19. The method of claim 18 wherein majority voting determination is performed by detecting a falling edges as a previously precharged comparator discharges.

20. The method of claim 16 further comprising using the majority voting determinations to determine whether to invert a data word.

* * * * *